Oct. 3, 1933.  M. LOUGHEAD  1,928,837
HOSE COUPLER
Filed Jan. 18, 1929  2 Sheets-Sheet 1

Inventor
Malcolm Loughead
By Williams, Bradbury, McCaleb & Hinkle
attys.

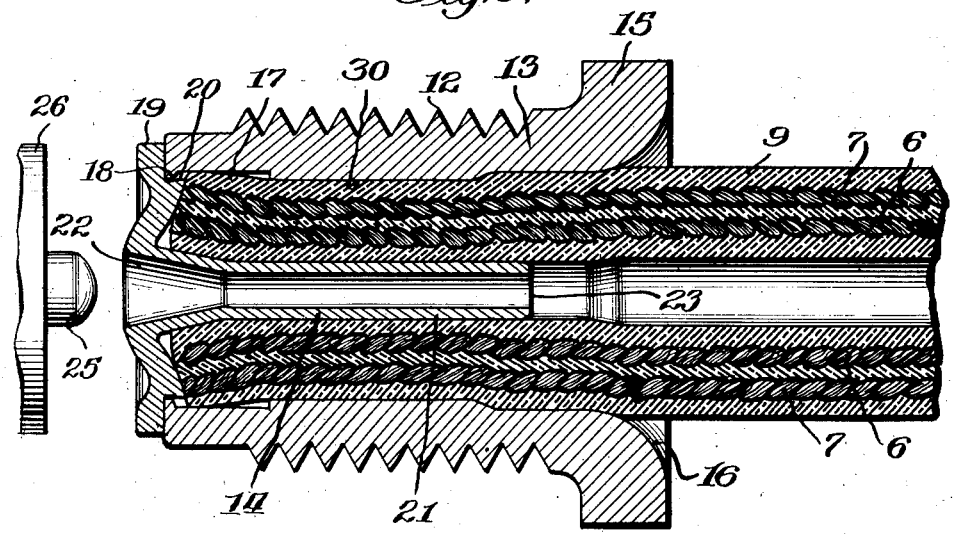
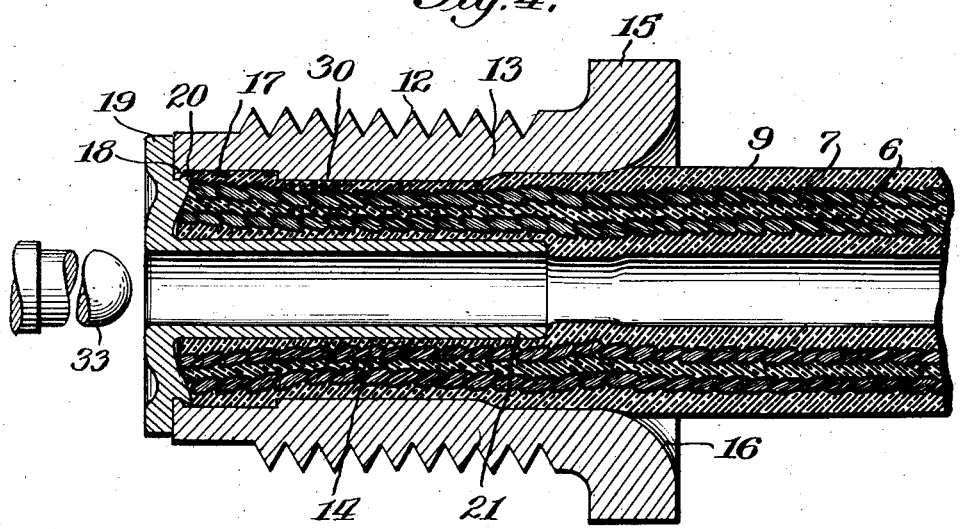

Patented Oct. 3, 1933

1,928,837

UNITED STATES PATENT OFFICE 1,928,837

HOSE COUPLER

Malcolm Loughead, Detroit, Mich., assignor to Hydraulic Brake Company, Los Angeles, Calif., a corporation of California Application January 18, 1929. Serial No. 333,308

9 Claims. (Cl. 285—84)

My invention relates to hose couplers and particularly to the construction and method of attachment of hose couplers.

Flexible hose is extensively used in hydraulic brake systems to interconnect relatively movable parts. In order for the hydraulic brake system to operate properly it is essential to provide hose which has practically no expansibility so that the volume of the hose will remain constant under varying pressure of the fluid therein.

A hose which has been found in practice to be highly satisfactory for this purpose comprises a rubber tube having a pair of layers of stranded material imbedded therein which renders the hose substantially non-expansible. The fluid pressure developed at times in a hydraulic brake system when a sudden stop is necessary rises to high values and makes it necessary to provide a strong and durable coupler for connecting the hose to metallic parts of the system. The problems involved in providing a coupler for a high pressure non-expansible hose are quite different from those involved in a coupler for a low pressure or expansible hose.

One of the objects of my invention is to provide an improved hose coupler.

Another object is to provide a coupler that will not separate from the hose when subject to severe longitudinal or separative forces incident to high pressure service.

A further object is to provide a hose coupling which is not subject to leakage under high pressure.

A further object is to provide a simple and economical method of constructing the improved coupling.

A further object is to provide a simple, reliable and relatively inexpensive hose coupling for high pressure duty.

A further object is to provide a hose coupling for a substantially non-expansible hose.

Other objects and advantages will appear as the description proceeds.

In the drawings:

Fig. 3 is a longitudinal section showing the internal thimble inserted in the hose and sleeve; and Fig. 4 is a longitudinal section of the completed coupling attached to a hose.

Figure 1:
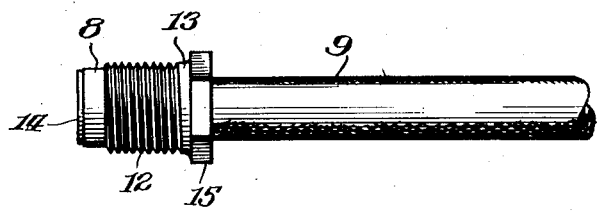
Fig. 1 is an elevation of a coupler attached to the end of a hose and embodying my invention.

Referring to the drawings and more particularly to Fig. 1, a coupler 8 is shown attached to a substantially non-expansible hose 9 comprising stranded layers 6 and 7 of braided material embedded in rubber. The coupler comprises generally a tubular sleeve 13 which may be a stamping upon which threads 12 are formed and a thimble 14 of any suitable material, preferably copper. The coupler may be attached to an appropriate complementary connector associated with a pressure fluid container, another hose or the like by means of the threads 12. The sleeve has a cylindrical portion with a flange 15 at the rear end thereof, the flange being provided with a hexagonal periphery to facilitate the threading of the coupler to another member.

The bore of sleeve 13 at the flanged end is given an outward flare 16 for the purpose of avoiding a sharp edge against the hose and obviating an abrupt bend when the hose is bent relative to the coupler. The bore at this end is of a slightly less diameter than the normal diameter of the hose so that when the hose is forced into this portion of the sleeve it will be slightly compressed.

Intermediate its ends the interior bore of the sleeve is smaller than at its ends providing an inwardly projecting annular portion 30 requiring a considerable compression of the hose to insert the hose in this portion of the sleeve. At its forward end sleeve 13 is provided upon its interior surface with a larger bore constituting an annular groove 17 which is cut close to the end of the sleeve, leaving a small and rather sharp annular ridge 18 projecting inwardly therefrom.

The thimble 14 includes a flange or annular disc-shaped portion 19 having an annular ledge 20 on its inner surface near the outer rim. The central portion of the disc is made convex and has a nipple 21 projecting rearwardly therefrom. The forward end of nipple 21 is formed with an outward flare or conical portion 22, the rear portion 23 of the nipple being cylindrical.

In assembling the hose connection the end of the hose may be reduced slightly in cross-section by abrading some of the material in the outer layer of the hose. The purpose of abrading the layer of the hose is to insure that the outer surface of the hose is concentric with the opening in the hose and also to insure that the end of the hose which is to be inserted in the sleeve has the proper diameter.

Figure 2:
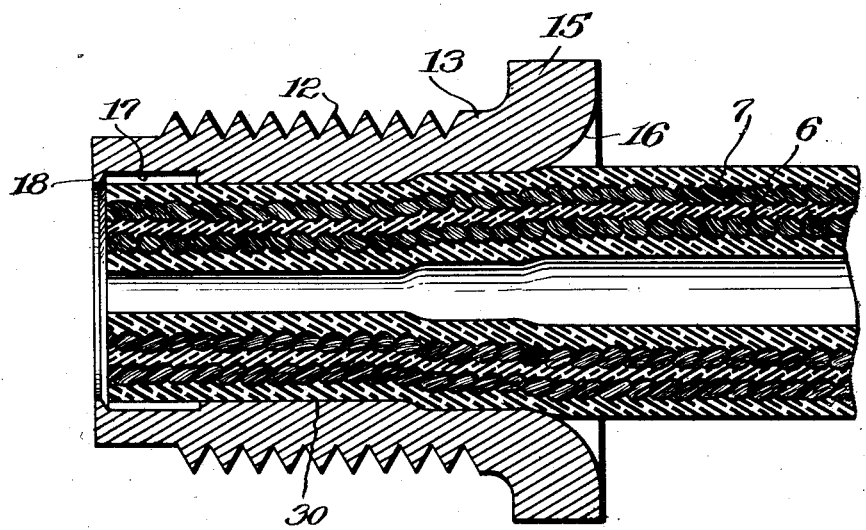
Fig. 2 is a longitudinal section showing the external sleeve with the hose forced into the sleeve illustrating a step in the method of assembling the hose and coupler.

In forcing the hose into the sleeve the portion of the hose in the rearward end of the sleeve is pressed only slightly while the portion of the hose within the central part 30 of the sleeve is compressed considerably more. After the hose is inserted in the outer sleeve, as shown in Fig. 2, thimble 14 is inserted in the hose as shown in Fig. 3. The thimble before being expanded has an outer diameter approximately equal to the internal diameter of the compressed portion of the hose. When the parts are assembled, as shown in Fig. 3, the end of the sleeve abuts the disc 19 and the annular ridge 18 rests upon the ledge 20 of the thimble.

A mandrel having a flat base 26 and a short centering plunger 25, which is of such diameter as to fit into the central aperture in the disc, is forced against the convex portion of disc 19, flattening the convex portion and expanding the disc radially outward so that the ridge 18 will be firmly imbedded in the ledge 20 which will extend to the bottom of groove 17.

During the flattening of the disc the conical portion 22 and the cylindrical portion 23 of the nipple will be moved further into the hose. Contraction of the central opening in the disc during the flattening of the convex portion is prevented by the pressure of plunger 25 therein. After the convex portion of disc 19 has been flattened, an expanding tool 33 is forced into the thimble, expanding the forward conical portion thereof and thereby forcing the material of the end of the hose radially outward into groove 17. Due to the fact that the ends of the strands of the braided layers of material within the hose are free, a certain amount of expansion of the end of the hose may take place so that a portion of the outer layer of stranded material extends into the groove.

Further movement of the expanding tool similarly expands or enlarges the rear cylindrical portion of the thimble, thereby causing the hose thereabout to be compressed against the interior wall of the intermediate portion of the sleeve. Thimble 14 is expanded until the internal diameter of the thimble is expanded to the normal internal diameter of the hose.

In this manner the hose is compressed between the sleeve and the thimble in the central portion of the sleeve to such an extent that the stranded layers of braided material are flattened and the thickness of the wall of the hose is reduced. The thimble extends rearwardly slightly beyond the central portion of the sleeve. However, the stranded layers of braided material will not be appreciably compressed at this point because the bore of the sleeve is slightly larger at this point, allowing the outer surface of the hose to expand to substantially its normal size. The expansion of the interior diameter of the hose at this point without a corresponding contraction of the outer diameter of the hose results in a gradual lessening of the compressive stresses on the hose at this point.

Beyond the end of the thimble the portion of the hose within the sleeve 13 is under no strain. This is a desirable feature due to the fact that the portion of the hose which is under strain will withstand very little flexing of the material without unduly wearing the material. In this construction of the hose coupling none of the materials under strain is flexed by bending the sleeve relative to the hose.

The interlocking of the flange or disc of the nipple with the outer sleeve is an important feature of the invention in that it securely and concentrically centers the nipple within the sleeve. It also prevents relative longitudinal movement of the thimble and the sleeve and makes it impossible for the hose to become disconnected from the coupler by first slipping with respect to one of the members of the coupler and then the other. The coupler is, therefore, capable of resisting high fluid pressure in the hose without leakage or danger of the hose and coupler being separated.

The method of assembling the connector to the hose is claimed in my copending application, Serial No. 311,721, filed October 11, 1928, of which the present application is a continuation in part.

Having illustrated and described the nature and embodiments of my invention, what I claim and desire to secure by United States Letters Patent is as follows:

1. In combination with a thick walled flexible hose having a tightly woven fabric layer and inner and outer layers of rubber, an expansible tubular member engaging the interior of the hose and having a flange abutting the end of the hose, and an externally threaded tubular member surrounding the hose and cooperating with the first tubular member to clamp the hose between them, said tubular members having interlocking portions including said flange to retain them in fixed longitudinal relation to each other.

2. In combination with a flexible hose having a slightly compressible but substantially non-expansible layer of fabric incorporated therein, an external member encompassing the hose, said member having an irregular internal surface and having a threaded external surface for making a coupling connection, an internal expansible member adapted to force the material of the hose into the irregularities of the external member, and a disc integral with one of said members abutting the end of the hose and rigidly interlocked with the other member.

3. In combination with a flexible hose, a sleeve surrounding the hose having an internal bore of slightly lesser diameter than the external diameter of the hose and having a groove on its interior surface, and an expansible thimble having a flange abutting the end of the hose and adapted tightly to force the material of the hose into the groove in said sleeve, said flange having a portion interlocking in said internal groove in said sleeve.

4. A connector for a flexible rubber covered tightly woven fabric hose, comprising a connecting member surrounding the hose and having an internal groove in such proximity to one end thereof as to form a ridge at said end, the diameter of said groove being substantially the same as the external diameter of said hose so that the latter expands into said groove in part due to the elasticity of the rubber covering of the hose, a deformed companion member for clamping the hose to said connecting and surrounding member, said companion member having a portion deformed into engagement with said ridge to form a rigid interlocking connection between said members.

5. A connector for a rubber hose having a tightly woven fabric layer externally and internally covered with layers of rubber, comprising a coupling sleeve surrounding the end of the hose and provided with external threads and an internally extending ridge, a member extending into the end of the hose, and a deformable disc integral with said member having an annular ledge deformed into overlapping engagement with the ridge of said sleeve.

6. The combination with a substantially non-expansible hose, of a hose fitting therefor, comprising an external sleeve surrounding the end of the hose and having a groove at one end thereof, and an internal nipple compressing the hose against the external sleeve, said nipple having a deformable radial flange deformed into interlocking relation into the groove in said sleeve thereby to rigidly connect said sleeve and nipple, said nipple abutting against the end of the hose and the flange thereof lying substantially flush with the end of said sleeve.

7. In combination with a hose having a layer of non-expansible material embedded therein, a sleeve surrounding the end of the hose and having a bore of smaller diameter than the outer diameter of the hose and having a portion of larger diameter at each end, a thimble shorter than the sleeve and extending into the sleeve beyond the portion thereof of small diameter and compressing the hose against said sleeve, the hose at the rearward end of said sleeve being under substantially no compressive strain, and tightly fitting interlocking parts on said sleeve and said thimble permanently to hold the thimble in place in said sleeve.

8. In combination with a rubber hose having a non-expansible layer of material embedded therein, a sleeve surrounding the end of the hose and having a bore portion of lesser diameter than the outer diameter of the hose and other portions of substantially the same diameter as the outer diameter of the hose, a thimble compressing the hose outwardly against the sleeve throughout the extent of the small diameter portion of the bore thereof, and a flange integral with said thimble engaging and interlocking with the end of said sleeve rigidly to hold said thimble in position in said sleeve.

9. A connector for thick walled flexible hose in which a substantially non-expansible layer of fabric is incorporated, comprising a sleeve having a bore with a portion of slightly lesser diameter than the external diameter of the hose and the remaining portion of the bore of substantially the same diameter as the external diameter of the hose whereby said hose will have a part thereof radially compressed upon insertion of the hose into the bore of said sleeve said sleeve having means on its external surface for making a fluid-tight connection with another connector, a thimble expanded in the bore of the hose so as tightly to clamp the hose against the portion of the bore of the sleeve of reduced diameter and to force a part of the substance of the hose into the portion of the sleeve bore of greater diameter, and means on said thimble permanently interlocking the thimble with said sleeve.

MALCOLM LOUGHEAD.